May 24, 1960
A. G. BUSCH ET AL
2,938,110
SAFETY SIGNALS
Filed July 22, 1957
FIG. 1
FIG. 2
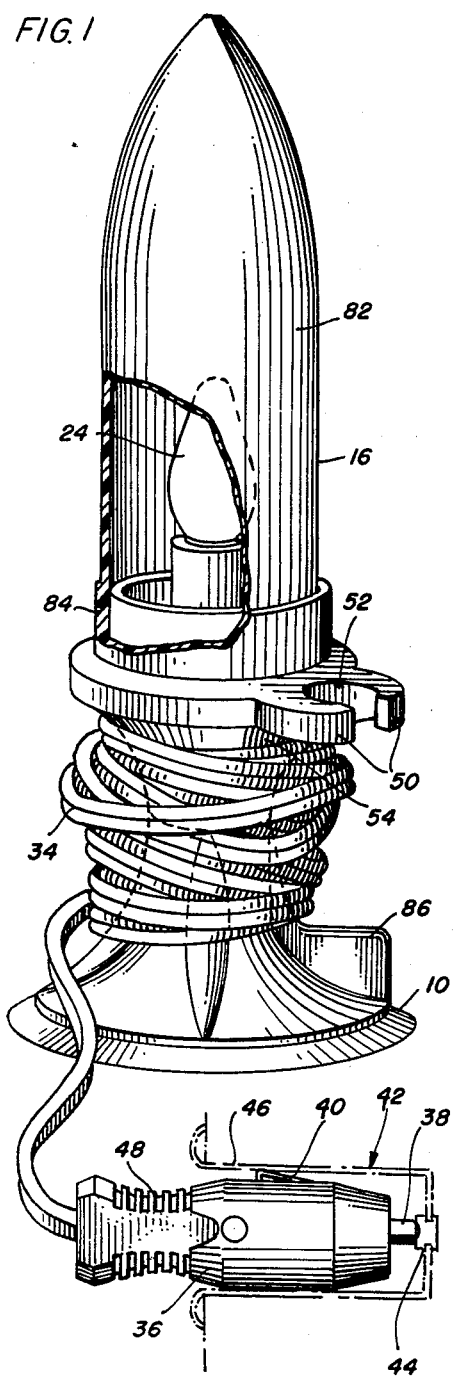
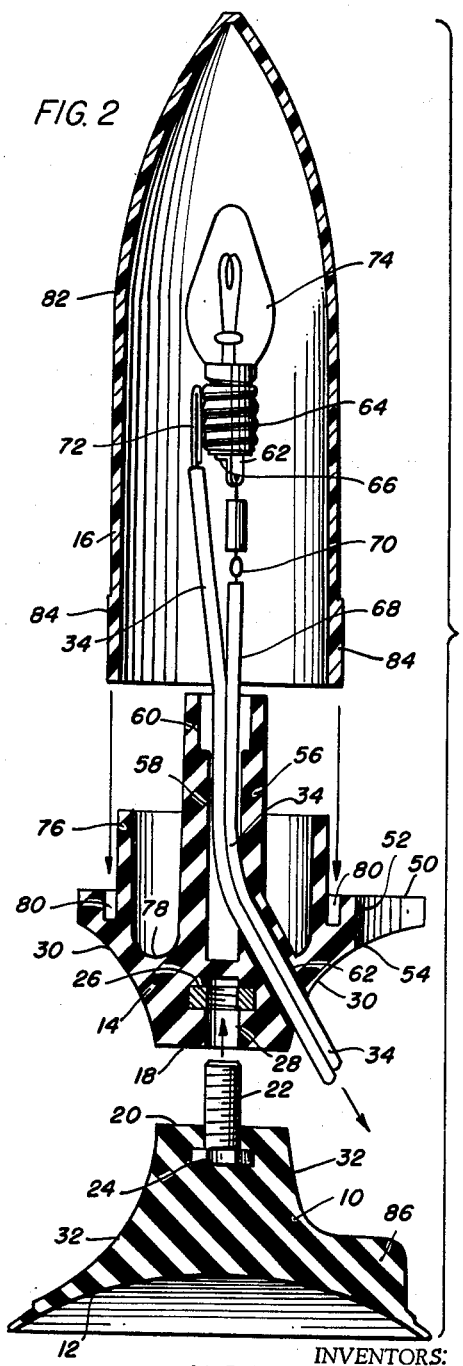
INVENTORS:
ALBERT G. BUSCH
JOSEPH W. FOCOSI
BY Kent W. Wonnell
ATT'Y

United States Patent Office 2,938,110
Patented May 24, 1960

2,938,110

SAFETY SIGNALS

Albert G. Busch, 619 Prairie Ave., Des Plaines, Ill., and Joseph W. Focosi, 5119 N. Nagle Ave., Chicago, Ill.

Filed July 22, 1957, Ser. No. 673,302

3 Claims. (Cl. 240—8.18)

This invention relates in general to an illuminated signal of the safety beam type and is more particularly described as a colored flare adapted to be used for safety signalling purposes in connection with an automobile although it may have a more general use wherever applicable.

An important object of the invention is to provide a signal which may be used in an emergency in connection with an automobile receiving current for an electric signal lamp from the battery of the automobile.

A further object of the invention is to provide an emergency light or signal which may be used in connection with an automobile by a plug-in connection with a cigarette lighter as usually provided in an automobile.

Still a further object of the invention is to provide a safety signal for automobiles which may be applied and attached to a plane surface with a suction cap base.

A further object of the invention is to provide a sectional base of flexible insulating material with one part forming a lamp support and another part forming an adhesive cup base, the parts being assembled by imbedded screw members.

Other objects of the invention are to provide with the two assembled parts, a reel upon which conductor wire may be wound when the signal is not in use; to provide a tab for disengaging the suction cup; to provide a projecting retainer for engaging and holding a conductor plug when the signal is not in use; to provide a self-locking channel for engaging conductor wires and a lamp socket centrally in the signal by pulling them together into place; to provide a socket in one of the signal parts surrounding a signal lamp therein into which a colored plastic cover is removably seated and retained for giving an attractive and distinguishing color to the signal lamp when it is used as a safety flare or signal, and in general to produce the structure herein shown and described.

Other objects of the invention will appear in the specification and will be apparent from the accompanying drawings in which Fig. 1 is a perspective view of a safety signal in accordance with this invention, with a part of the cover broken away to show the position of an electric lamp therein and with a connector plug removed from its holder and positioned in a lighting socket to illustrate its application in use; and Fig. 2 is a sectional view of the signal structure as shown in Fig. 1 with the parts separated and in position to be united for the assembled position as shown in Fig. 1.

As a utility and warning light, this safety signal has many uses for automobiles and trucks, the shield glows with a bright red warning light visible by day and by night; it is always ready for use with no separate batteries to run down or wear out; the conductor wire ordinarily rolled around the holder is of sufficient length to reach all parts of an automobile; to provide illumination as well as a flare and the parts of the signal are of unbreakable plastic material so that they will have a long life even with rough usage.

Referring now more particularly to the drawings, this safety signal comprises a base 10 with an adhesive cup 12 at its lower side for attachment by suction to a metal, glass or other surface impervious to air, a lamp holder 14 and a lamp shield 16. The lamp holder and base parts are preferably formed separately of a flexible plastic material such as rubber and rubber-like plastics having common flat meeting surfaces 18 and 20 which are joined and held together by a threaded bolt 22 having its head 24 imbedded in one of the parts as the base 10, with the threaded portion projecting from the surface 20 and with a threaded nut 26 embedded in the lamp holder part 14 and having a bore extending from its meeting surface 18 to register with the threads of the nuts 26 so that when these marks are threaded together, the lamp holder and the base will be tightly connected against the meeting parts 18 and 20, and the outer surfaces 30 and 32 respectively will form a flanged reel upon which conductors 34 may be wound for holding them compactly in place.

At one end of the conductors 34 is an attachment plug 36 having a spring end contact 38 and a laterally projecting spring contact 40 adapted to be inserted in a lighting socket 42 of the type ordinarily provided in connection with automobile lighters having an inner end contact 44 to engage the end contact 38 of the attachment plug and having a shell 46 insulated from the end contact 44 and adapted to be engaged by the lateral spring contact 40 of the attachment plug.

With this attachment plug, an electrical connection is quickly made by inserting the plug within the socket until the end contact 38 makes electrical connection with the stationary end contact 44 at the inner end of the socket. The attachment plug is preferably of sufficient length to provide a grooved handle 48 which projects from the upper end of the socket 42 and provides means for inserting and removing the plug from the socket.

Projecting laterally from one side of the flange portion of the lamp holder 14 are opposite projections 50 with a recess 52 between them having a reduced outer opening between which the attachment plug may be inserted and seated in the larger recess 52 as indicated in broken outline in Fig. 1. This not only locates the attachment plug but also provides means for holding the conductors 34 in wound position about the reel formed by the outer surfaces 30 and 32. Each of the separate projections 50 is preferably supported by a strengthening rib 54 extending angularly from the under side of the projection to the adjacent wall of the lamp holder 14.

Inside of the upper portion of the lamp holder 14 and preferably formed integral therewith is a hollow projecting stem 56 having a central bore 58 with an enlarged portion 60 at the outer end, extending laterally at an angle from the bore 58. At one side near the bottom is a connecting bore 62 so that the conductors 34 may extend from the outer end of the stem through the bore 58 and outward in the angular bore 62.

A miniature lamp socket has an outer shell 64 and an end insulated contact connected to a conductor 66 which is joined to a wire 68 of one of the conductors 34 through a resistor 70 and another of a pair of twin conductors 34 has a stranded or stripped wire extremity 72 which extends parallel with the lamp shell 64 in the assembled position as shown in Fig. 2 so that when a pair of conductor wires 34 is inserted upwardly through the angular bore 62 the central bore 58 and the enlarged portion 60 are thus connected to the terminals of the miniature lamp socket, the assembly is then pulled downwardly from the lower end of the angular bore 62 as indicated which will draw the resistor and its connection into the central bore 58 and will seat the socket shell 64 in the enlarged portion 60 with the bare wire 72 held tightly in contact with the shell and making a firm electrical connection therewith without requiring any additional soldering operation. An electric lamp 74 may be placed in the socket shell 64 either before or after the conductors are pulled downwardly into place, and the lamp is easily replaced or renewed in this position.

Spaced outwardly from the stem 56 is a circular flange 76 less in height (or length) than the stem and separated from it by a circular ring depression 78 which makes the flange somewhat flexible. Surrounding the flange, close to the outer face thereof, is a groove 80 which also contributes to the flexible movement of the upper portion of the flange 76 extending outwardly therefrom.

A shield 82 which tapers to a rounded tip at its outer end is formed of a rigid plastic material which is preferably translucent and colored red so that when the lamp 74 is lighted, the shield will glow with such prominance that the signal serves as a safety warning or indication at the lower end of the shield, it is preferably formed with a thickened external rim 84 which fits closely into the groove 80 at the outside of the flange 76 and is pressed tightly in the groove to hold it resiliently in place due to the flexible character of the lamp holder itself.

After the lamp socket 64 and its conductor connections are pulled tightly in place in the outer end of the hollow stem 56, the end of the shell 64 will be at the upper end of the stem and a lamp 74 may be inserted and replaced before the shield is inserted in the lamp holder. Thereafter the shield 82 may be placed in position for the complete assembly of the signal.

If this signal is to be used for repairing or illuminating any portion of an automobile, the shield 82 may be omitted or removed so that a white light will be provided for making repairs and illuminating various parts of the automobile. It is also apparent that the shield may be a clear transparent plastic and the lamp 74 may be colored either red or some other distinguishing color.

When the signal is not in use, the conductors 34 either in the form of a twin conductor or separate wires may be wound around the outer reel surfaces of the base 10 and lamp holder 14 and retained in the wound position by inserting the attachment plug 36 in the recess 52 between the resilient projection 50.

With this construction, the conductors do not become kinked or snarled, and the parts are held firmly in place and ready for use by removing the attachment plug, inserting it in the lighting socket 42 and unwinding the conductors 34 to the extent desired. The signal is set up against the metal or glass of an automobile by pressing the adhesive cup 12 tightly in place which will adhere until it is removed.

To assist in removal of the base from a surface to which it is attached, a thin projection 86 is preferably formed at one side of the base 10 which extends outwardly at right angles and provides a finger hold or a means for the engagement of a pair of pliers in removing the base from a surface upon which it is tightly applied.

After any use of this safety signal either as an illuminating light or as a colored flare, the plug 36 is removed from the automobile socket, the conductors 34 are wrapped about the reel portion and the plug is again inserted in the recess 52.

While we have thus described a preferred construction in some detail, it should be regarded by way of an illustration and example rather than as a restriction or limitation thereof, as many changes in the construction, combination and arrangement of the parts may be made without departing from the spirit and scope of the invention.

We claim:

1. In a safety signal device, a base of resilient insulating material having a suction cup at the bottom, a surrounding concave conductor winding drum and concentric circular projections at the end opposite the cup; the inner circular projection forming a hollow stem with an outlet therefrom in the concave surface of the drum; an electric lamp seated in the hollow stem of said projection, and conductors attached to the lamp terminals and extending through said stem and outlet for drawing the lamp into said stem; the conductors windable upon said drum; and a light-transmitting shield for the lamp having a circular base seated between adjacent circular projections and surrounding the lamp and its stem.

2. In a safety signal in accordance with claim 1, the base comprising parts separable transversely in the concave portion of the drum and having cooperating screw and nut elements embedded in the adjacent parts for detachably securing the parts together.

3. In a safety signal in accordance with claim 1, the suction cup having a relatively thin projection extending from the side opposite the cup and providing an engageable ear for removing the cup from a surface to which it is attached.

References Cited in the file of this patent

UNITED STATES PATENTS

| | | |
|---|---|---|
| 1,330,974 | Bauman et al. | Feb. 17, 1920 |
| 2,141,240 | Dover | Dec. 27, 1938 |
| 2,182,446 | Nelson | Dec. 5, 1939 |
| 2,404,753 | Siemers | July 23, 1946 |
| 2,496,618 | Cox et al. | Feb. 7, 1950 |
| 2,675,545 | Wolper | Apr. 13, 1954 |
| 2,695,393 | Tisgione | Nov. 23, 1954 |
| 2,704,839 | Sweet | Mar. 22, 1955 |
| 2,812,423 | Penna | Nov. 5, 1957 |